No. 624,056. Patented May 2, 1899.
T. LEE.
APPARATUS FOR SEPARATING MIXED FIBERS.
(Application filed Jan. 14, 1898.)
(No Model.) 5 Sheets—Sheet 3.
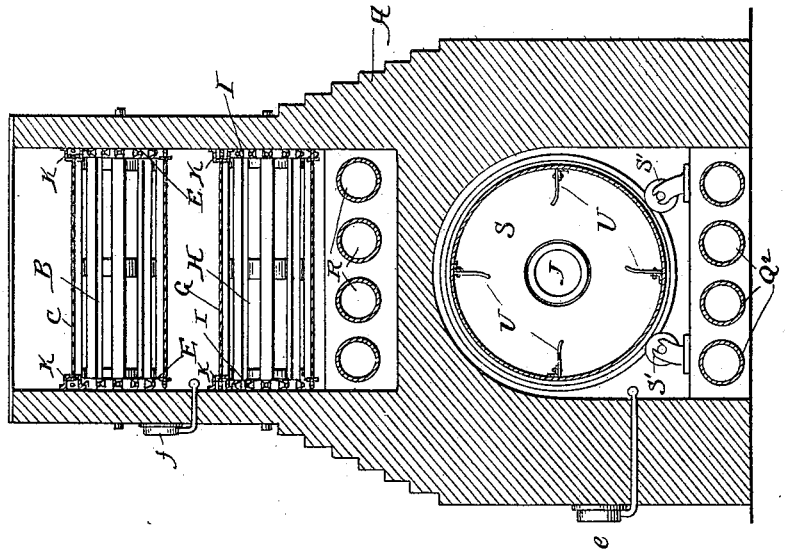
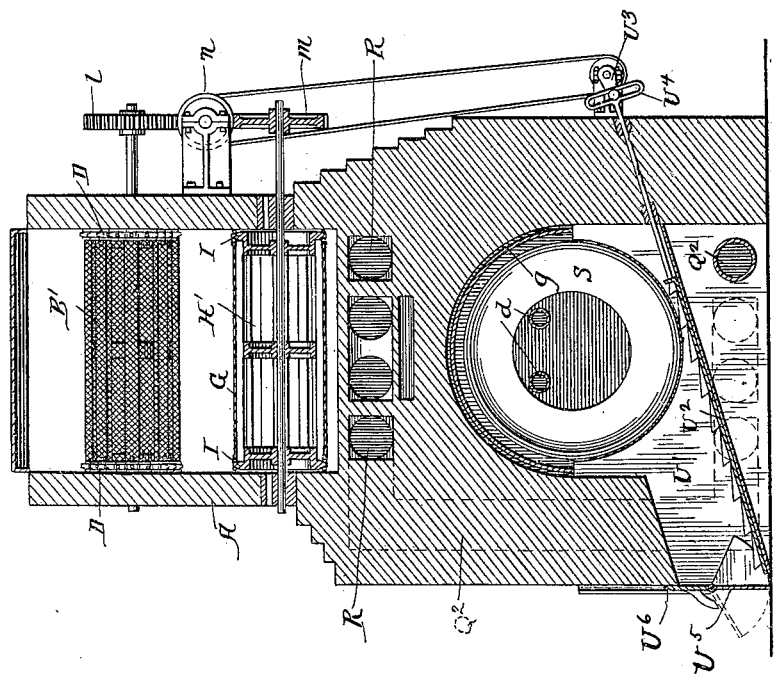
Witnesses:
H. B. Hallock.
R. M. Pierce
Inventor:
Thomas Lee.
by S. Williamson
Attorney No. 624,056. Patented May 2, 1899.
T. LEE.
APPARATUS FOR SEPARATING MIXED FIBERS.
(Application filed Jan. 14, 1898.)
(No Model.) 5 Sheets—Sheet 4.
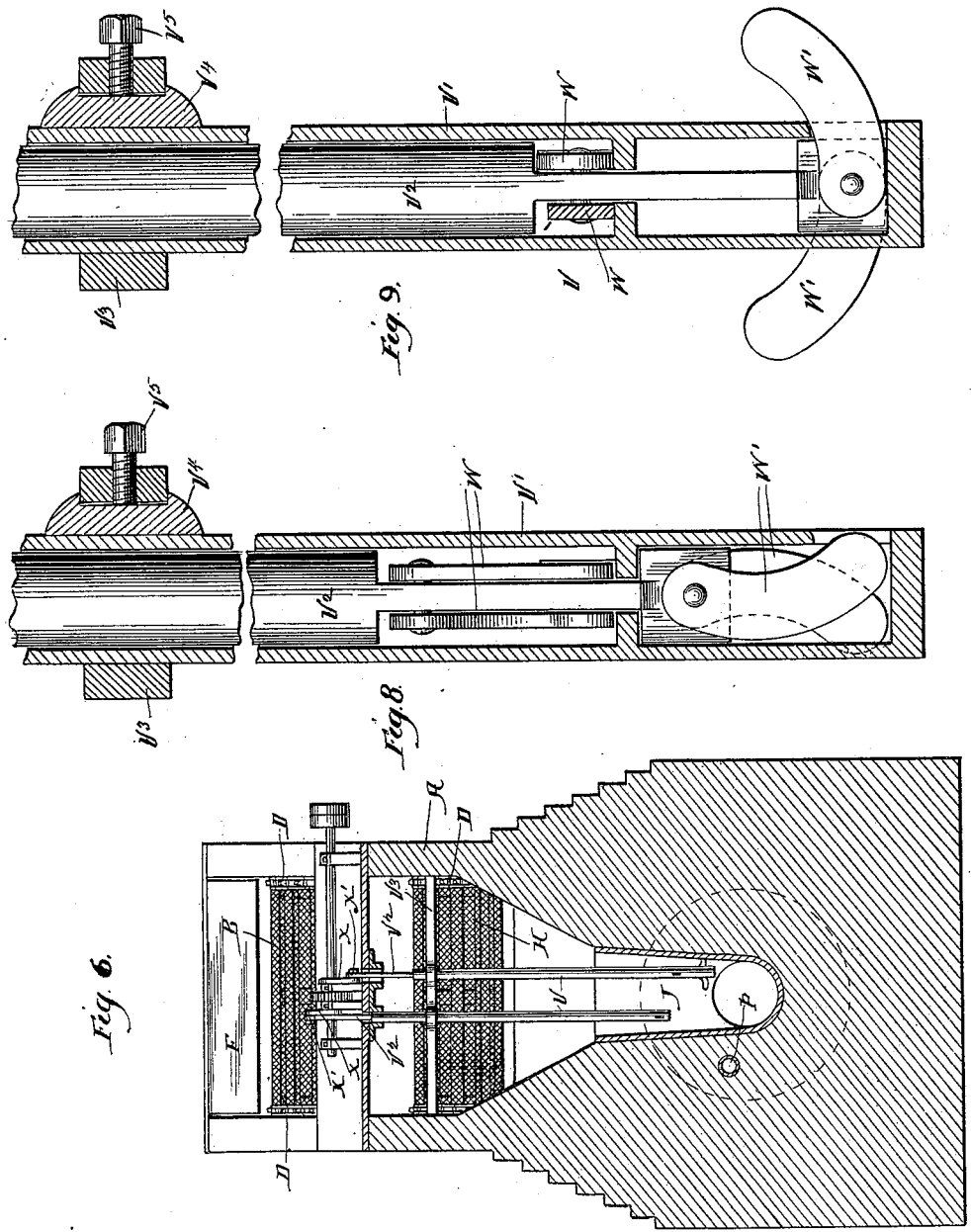

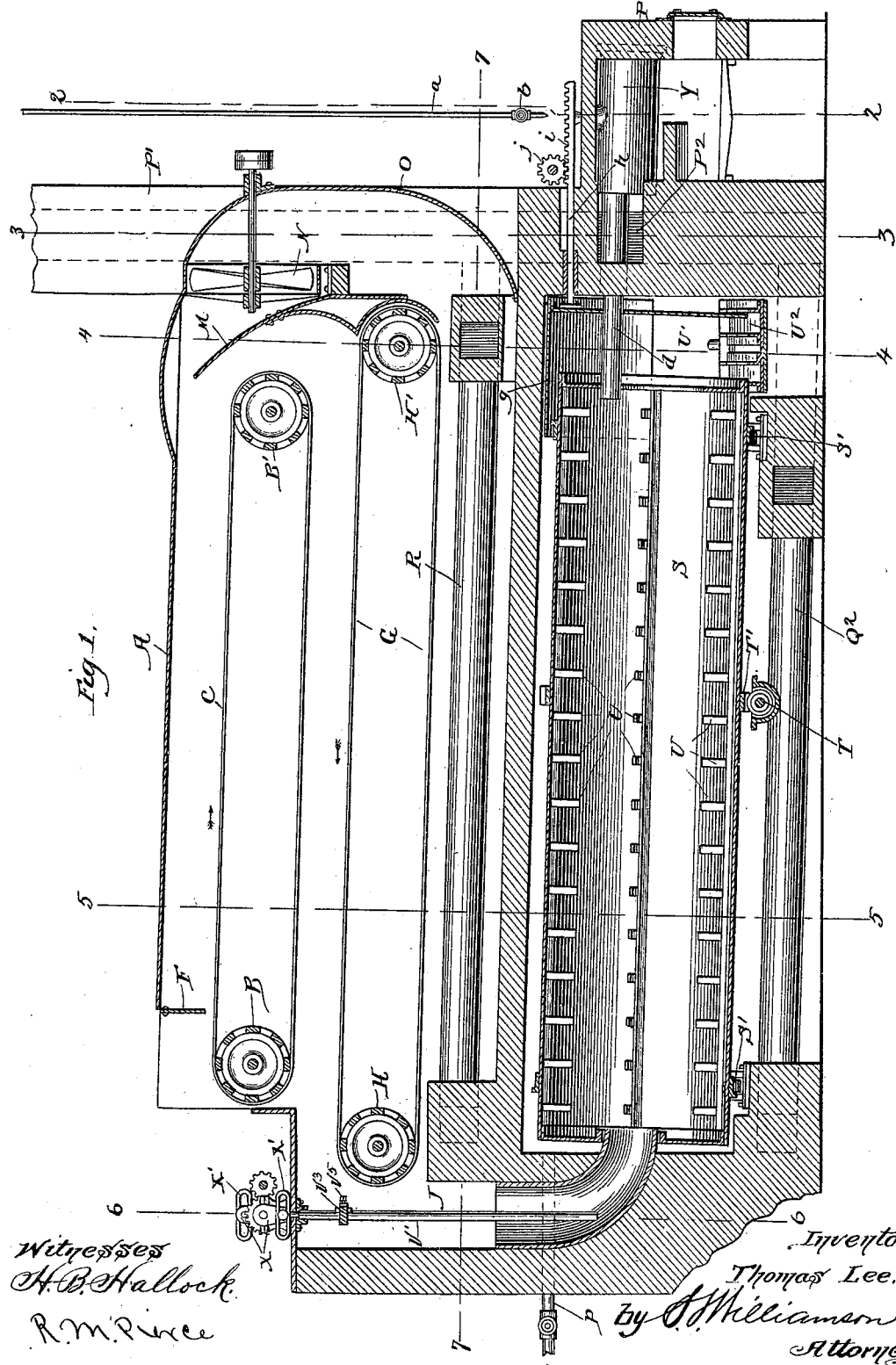

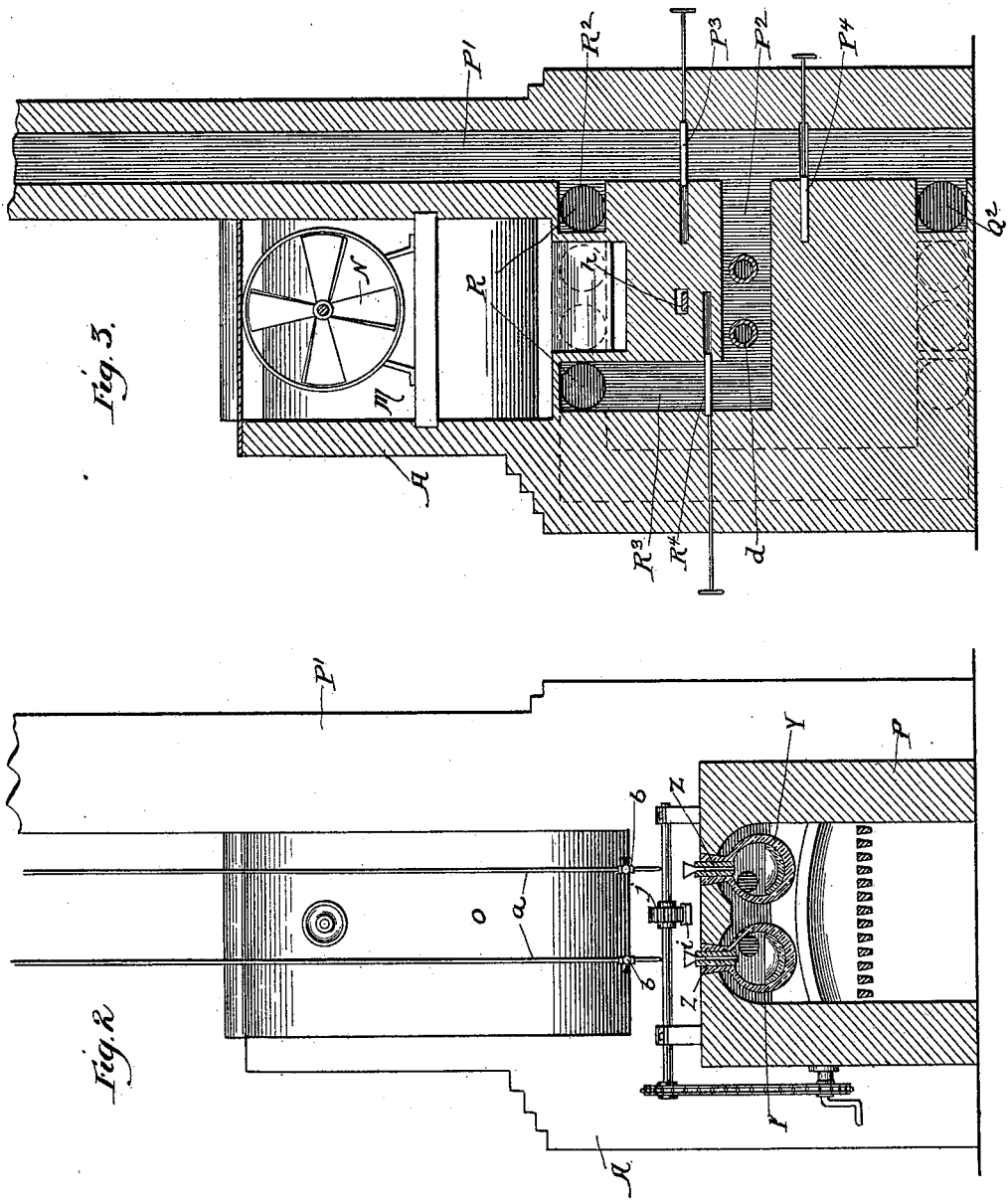

No. 624,056. Patented May 2, 1899.
T. LEE.
APPARATUS FOR SEPARATING MIXED FIBERS.
(Application filed Jan. 14, 1898.)
(No Model)  5 Sheets—Sheet 5.
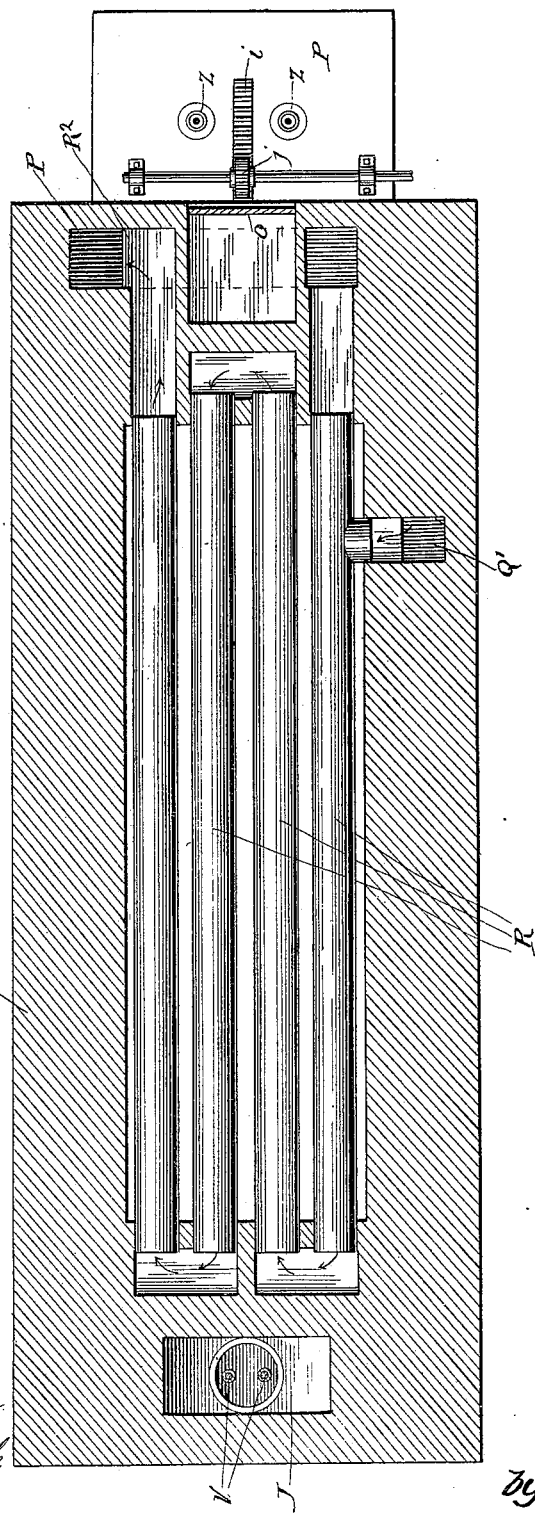
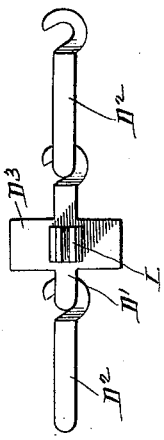
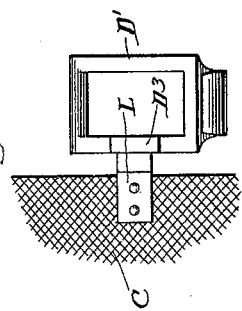
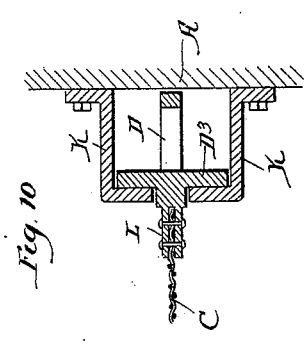
Witnesses:
H. B. Hallock
R. M. Pierce
Inventor.
Thomas Lee.
by J. J. Williamson
Attorney.

UNITED STATES PATENT OFFICE.

THOMAS LEE, OF PHILADELPHIA, PENNSYLVANIA, ASSIGNOR, BY MESNE ASSIGNMENTS, TO THE STERLING DRYING AND CARBONIZING MACHINE COMPANY, LIMITED, OF SAME PLACE.

APPARATUS FOR SEPARATING MIXED FIBERS.

SPECIFICATION forming part of Letters Patent No. 624,056, dated May 2, 1899.

Application filed January 14, 1898. Serial No. 666,607. (No model.)

*To all whom it may concern:*

Be it known that I, THOMAS LEE, a citizen of the United States, residing at Philadelphia, in the county of Philadelphia and State of Pennsylvania, have invented a certain new and useful Improvement in Apparatus for Drying and Carbonizing Vegetable Matter from Animal Fiber, of which the following is a specification.

My invention relates to a new and useful improvement in apparatus for drying and carbonizing vegetable matter from animal fiber, and has for its object to provide an effective device of this description which shall first thoroughly dry the material to be treated and convey the same to a rotary cylinder, in which the vegetable matter contained within the material will be carbonized, so as to become a light dust, which may be beaten from the material after being removed from the apparatus by any suitable mechanical devices.

Another object of my improvement is to so construct the carrier-aprons as to provide a positive support for the edges thereof and at the same time prevent the passage of the drying medium around the edges of the apron and also prevent the entanglement of the material being treated with the drive-chain carrying the apron.

A still further object of my invention is to utilize the furnace which heats the drying medium for gasifying the acid which is used to carbonize the vegetable matter.

With these and other incidental objects in view this invention consists in the details of construction and combination of elements hereinafter set forth and then specifically designated by the claims. Furthermore, I contemplate using the drying apparatus as a carbonizer under certain conditions, as well as a drier; also, the carbonizing-cylinder as a drier when occasion may require, as well as for carbonizing.

In order that those skilled in the art to which this invention appertains may understand how to make and use the same, the construction and operation will now be described in detail, referring to the accompanying drawings, forming a part of this specification, in which—

Figure 1 is a longitudinal section of an apparatus made in accordance with my improvement; Fig. 2, a cross-section at the line 2 2 of Fig. 1; Fig. 3, a section at the line 3 3 of Fig. 1; Fig. 4, a section at the line 4 4 of Fig. 1; Fig. 5, a section at the line 5 5 of Fig. 1; Fig. 6, a section at the line 6 6 of Fig. 1; Fig. 7, a horizontal section at the line 7 7 of Fig. 1; Fig. 8, a detail view of the injector-rods, showing the feet thereof closed as when being drawn upward; Fig. 9, a similar view showing the feet distended as when moving downward; Fig. 10, a detail section of one of the housings for inclosing the drive-chain by which the carrier-apron is operated; Fig. 11, a plan view of one of the links of the chain, showing the apron attached thereto; and Fig. 12, an elevation of three of said links.

In carrying out my invention as here embodied, A represents a casing of sufficient dimensions to provide for the proper manipulation of the material during the drying process. Within this casing are mounted the drums B and B', over which runs the carrier-apron C. This apron is composed of wire-netting, preferably copper, and is connected along its edges to certain links of chains D. These chains, one upon each side of the casing, mesh with the sprocket-wheels E, said wheels being carried by the same shafts as the drums, so that the chains and apron will travel in perfect unison without the tendency for either to drag, and the construction and arrangement of these chains will be hereinafter set forth.

The drum B is so arranged relative to the casing that a portion of the upper side of the apron C passes beyond the top of the casing, thus exposing a sufficient portion thereof to provide for the placing of the material to be treated upon the apron, and a swinging door F is located at this point in order that the compartment within the casing may be normally closed, and yet when material is placed upon the apron and the latter is traveling in the direction of the arrow marked adjacent thereto this swinging door will be forced open and may thereafter regain its normal position.

A carrier-apron G, similar to the apron C, is arranged below the latter and mounted upon the drums H and H', and the shafts of these drums are likewise provided with sprocket-wheels I, over which run drive-chains similar to the chains D and for the same purpose. This carrier-apron travels in the reverse direction from the apron C and is somewhat longer than the latter, thus projecting beyond the same at each end, the result of which is that when the material has traveled the length of the upper portion of the apron C it will be precipitated upon the upper portion of the apron G and again carried forward throughout the length of the casing until falling from the last-named apron into the chute J.

Each of the drive-chains consists of a series of links D', which are coupled together by the links $D^2$, and the links D' have formed therewith the blocks $D^3$, which travel within the housings K, which consist of two properly-shaped irons bolted upon the inside of the casing, so as to inclose the chains, and these blocks in traveling within the housings support the links of the chain as well as the weight of the carrier-aprons, since they are connected therewith by the shanks L. These housings not only serve as supports for the chains and through the latter for the carrier-aprons, but also protect the chains from entanglement with the material being treated, which would otherwise interfere with the passage of the chains over their sprocket-wheels, as will be readily understood. A baffle-plate M is located in the rear of the casing, and back of this plate is mounted a suitable fan or exhaust N, which when properly revolved will draw the air from the upper portion of the compartment within the casing and force it downward through the hood O, causing it to reënter the compartment, at the bottom thereof, to take the place of the air previously exhausted above. A continued motion of this fan, as is obvious, will create a strong circulation within the casing, and this circulation being previously caused to pass through the meshes of the carrier-aprons will come in contact with every part of the material being treated, thus extracting the moisture therefrom. This air of course should be heated, and this is provided for by the furnace P, which is connected with the chimney or stack P' by the flue $P^2$, and above and below the point where this flue enters the stack dampers $P^3$ and $P^4$ are placed in order that the draft or products of combustion may be forced downward through the series of pipes before finally passing out of the stack or be permitted to flow directly upward through the stack. Leading from the bottom of the stack is a series of pipes $Q^2$, which pass back and forth at the bottom of the apparatus and afterward are connected by the uptake Q' to a series of pipes R, which lead back and forth in the lower portion of the drying-compartment, and these last-named pipes finally connect with the stack as indicated at $R^2$, and this connection is above the damper $P^3$, so that when this damper is closed and the damper $P^4$ is opened it follows that the products of combustion in passing to the stack must first pass downward through the series of pipes Q, then upward through the uptake Q', then back and forth through the pipes R, and, finally, into the stack, from whence they may escape in the ordinary manner. In order to further control the products of combustion, and consequently utilize the heat contained therein for the various operations of the apparatus, a flue $R^3$ leads upward from the flue $P^2$ and connects directly with the pipes R and has therein a damper $R^4$, which when closed will prevent the passage of the products of combustion in this direction, but when open and the two dampers $P^3$ and $P^4$ are closed the products of combustion instead of passing upward and through the pipes Q to reach the pipes R will pass directly to the pipes R and then back and forth to the stack at the point $R^2$, as before described.

A carbonizing-tank S of cylindrical shape is mounted in suitable roller-bearings S' in the lower portion of the apparatus, beneath the drying-compartment, and is adapted to be revolved by the worm T, meshing with the worm-wheel T', secured around this cylinder, and the chute J leads into the tank at the center of one end thereof, and it is to be noted that the portion of the chute that thus enters the tank forms a curved elbow, the object of which will be hereinafter set forth. The interior of the cylinder has series of ribs U so arranged as to agitate the material fed thereto, and the rear portion of the cylinder opens in the compartment U',so that the material passing therefrom will enter this compartment, from whence it will be fed sidewise by the push-out $U^2$, having serrated ribs thereon and being adapted to reciprocate to and fro by the crank $U^3$, operating in the slotted head $U^4$, as clearly shown in Fig. 4.

When the material passes from the apron G and falls within the chute J, it is necessary that it shall be forced downward through said chute into the carbonizing-tank, and this is accomplished by the mechanism next to be described.

Two plungers V are arranged within the chute, each plunger consisting of an outer tube V' and an inner rod $V^2$, the former passing through the cross-bar $V^3$ and given a certain amount of retarding friction by a shoe $V^4$, which is backed up by a set-screw $V^5$, the object being to permit this tube to move up and down, but to have a certain amount of dragging action. The rod $V^2$ has pivoted thereto two sets of fingers W and W', each set arranged at right angles to each other, said fingers being so curved and located as to normally lie within the tube, as clearly shown in Fig. 8; but when the rod starts upon its downward movement these fingers will be forced outward through suitable slots in said tube until reaching the position shown in Fig.

9, after which the tube itself will be caused to move downward with the rod, and as these fingers are then spread it is obvious that the material within the chute will be crowded downward; but upon the commencement of the reverse or upward movement of the rod the fingers will be drawn inward, since the rod will move in advance of the tube on account of the dragging action of the latter, so that the fingers will thereafter have no action upon the material, and the rod and tube may then continue their upward movement without elevating the material which has previously been forced downward, and a repetition of this action of the plunger will obviously force the material through the elbow of the chute in the cylinder. In crowding down the material through the elbow of the chute it follows that said material will become packed in the lower portion of the elbow just before entering this cylinder and therefore effectually prevent the outflow of gases at this point, which heretofore has been a great detriment both to the machine, the surrounding objects, and to the operators inhaling the same. This feature of my apparatus is of great importance, as it renders the process more economical.

The plungers are given their vertical reciprocating movement by the cranks X, operating the slotted heads X', formed upon the upper end of the rods. These cranks receive their motion from any suitable mechanism, such as a train of gears, pulleys, and belts.

It is to be noted that the material being forced from the chute into the cylinder while the latter is being revolved, the entire contents of the cylinder will be given a gradual feeding movement toward the rear end of the cylinder, since the revolving of the cylinder will have a tendency to partially suspend the material therein at all times, and the crowding in of the material from the chute will bring about the desired result of feeding the material rearward.

The carbonizing of the vegetable matter contained within the material being treated is effected by a gas formed from muriatic or other acid, and the gasifying of said acid is brought about by means of the retort Y, which is located within the furnace and therefore kept at the proper temperature, and the acid is introduced thereto through a soapstone funnel or inlet Z. In practice I prefer that the acid shall be fed to the soapstone funnel by means of a hard-rubber tube $a$, having a suitable valve $b$ for regulating its flow, and the nozzle of this tube terminates above the soapstone funnel in order that the acid flowing therefrom will be caught by said funnel and guided to the retort. A pipe $d$ leads from the retort into the carbonizing-cylinder, so that as soon as the acid is gasified it passes through this pipe and after gaining access to the cylinder commingles with the material therein, with the effect of carbonizing any vegetable matter and this carbonization reduces said matter to a light powder, which is easily separated from the animal fiber after it has been removed from the cylinder. It is to be noted that this pipe $d$ leads from the end of the retort directly through the flue of the furnace to the cylinder, and is thus at no point exposed to the surrounding atmosphere, and consequently assists in maintaining the temperature of the gas, as will be readily understood.

As it is essential that a proper degree of heat shall be maintained in the cylinder to effect the carbonization of the vegetable matter without liability of injuring the animal fiber, a thermometer $e$ is connected with the compartment U', thus providing for the determining of the degrees of heat within the cylinder, which may be regulated by the dampers, as before set forth. Likewise a thermometer $f$ may be connected with the drying-chamber, so as to determine the temperature therein. A hood $g$ is fitted over the rear end of the cylinder, so as to inclose the same and thus prevent the escape of the carbonizing gas therefrom, which would otherwise be absorbed by the bricks, and this hood is made adjustable by the rod $h$ being attached thereto and extending rearward and terminating in the rack-bar $i$. A pinion $j$ meshes with the rack-bar, so that the hood may be opened or closed by the proper manipulation of this pinion, and when closed the feeding of the material from the cylinder will be arrested, so that although the feeding thereto may be continued for a limited time this material will not pass therefrom, and thus permit an accumulation within the cylinder, which may be utilized to carry on the carbonization after the apparatus has been stopped, since the gas which is contained within the cylinder will, when left therein a sufficient length of time, properly treat the entire mass.

A door $U^5$ is hinged to a slide $U^6$ and so arranged as to permit the withdrawal or outflow of the material from the compartment U', and when the material is crowded within this compartment this door will automatically swing open for the relief thereof.

The operative parts of the apparatus may be given motion by any suitable mechanism, and I have here shown the drums over which the carrier-aprons pass as being operated by worm-wheels $l$ and $m$, secured upon the shafts of certain of the drums, and these worm-wheels mesh with the worm $n$ and are thus revolved in opposite directions at the relatively slow speed which is necessary to revolve for the gradual feeding of the material to be treated through the drying-chamber.

It is to be noted that a pipe $p$, having a suitable valve therein, is connected with the front end of the cylinder, the object being to create the proper flow of gas within said cylinder.

Of course I do not wish to be limited to the exact details of construction here shown, as these may be altered to a considerable extent without departing from the spirit of my invention.

Having thus fully described my invention, what I claim as new and useful is—

1. In a device of the character described, a chamber, housing arranged therein and a conveyer-chain having certain of its links provided with blocks adapted to engage the walls of the housing to form guides, shanks L, formed on the blocks, said shanks having bifurcated ends, carrier-aprons having their edges embraced by the shank ends, substantially as described.

2. In a device of the character described, a drying-compartment, an elbow leading from the drying-compartment, packing-rods operating vertically in the elbow as and for the purpose described.

3. In an apparatus of the character described, a casing inclosing a drying-compartment, two sets of drums mounted within said compartment, two carrier-aprons consisting of wire-netting adapted to run over the drums, endless chains attached to the edges of the aprons, sprocket-wheels upon the same shafts with the drums over which the chains run, and housings arranged upon the side walls of the compartment in which the chains travel, as specified.

4. In an apparatus of the character described, a drying-compartment having means mounted therein for conveying the material to be treated to and fro, a fan for creating a circulation of the air within the compartment, a chute for receiving the material from the drying-compartment, reciprocating plunger-rods for forcing said material downward, an elbow formed in the chute, a revolving cylinder to which said elbow leads, means for supplying acid-gas at the proper temperature to the cylinder, as and for the purpose set forth.

5. In combination with a drying apparatus and carbonizing apparatus, a chute leading from the former to the latter having an elbow at the lower end thereof, two plungers and means for reciprocating said plungers, substantially as and for the purpose set forth.

6. In combination with an apparatus of the character described, a chute leading from the drying-compartment to the carbonizing-compartment, an elbow formed in the lower portion of said chute, two plungers consisting of tubular sections, and rods adapted to move therein, fingers pivoted to the rods and projecting through the tubes so as to be distended and retracted, and mechanism for manipulating the plungers, as and for the purpose set forth.

7. In combination an apron, chains for carrying the aprons, links forming the chain, blocks formed with the links, a housing in which the blocks travel, shanks joined to the aprons and formed with the blocks, as and for the purpose described.

8. In combination with a carbonizing-tank of an apparatus of the character described, a push-out having serrations thereon and means for reciprocating the push-out in order that the material fed from the tank may be conveyed sidewise, as shown and described.

9. In combination with a carbonizing-tank of the character described, a hood fitted over the end of the cylinder and arranged to be adjusted back and forth relative to the tank, and means for bringing about this adjustment whereby the feeding within the tank may be controlled, as specified.

In testimony whereof I have hereunto affixed my signature in the presence of two subscribing witnesses.

THOMAS LEE.

Witnesses:
D. V. CHADWICK,
C. L. REESE.